No. 615,269. Patented Dec. 6, 1898.
S. GRESS.
THILL COUPLING.
(Application filed Aug. 2, 1898.)
(No Model.)
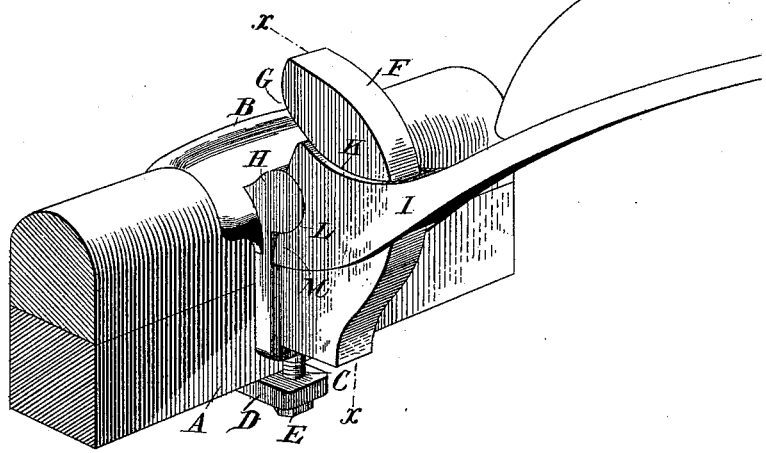
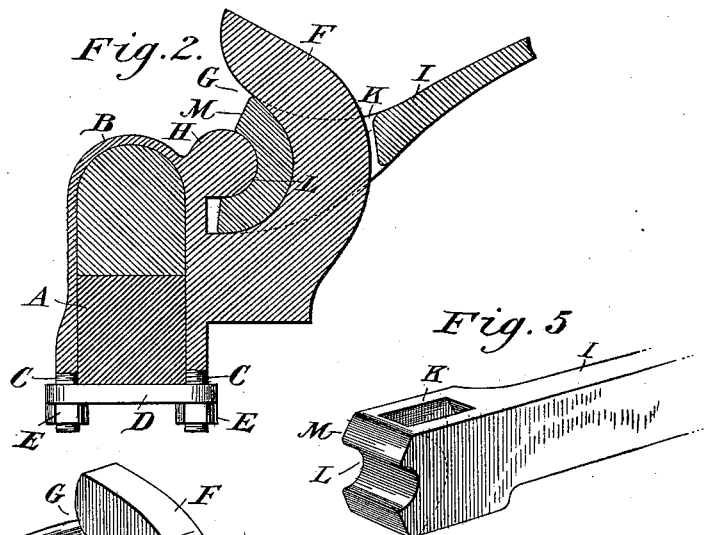
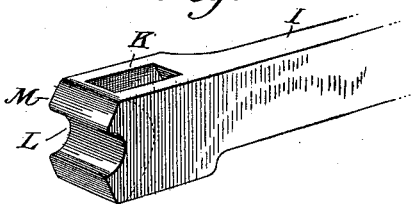
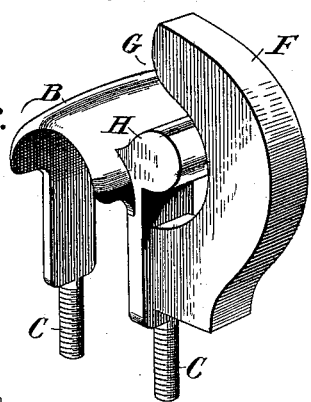
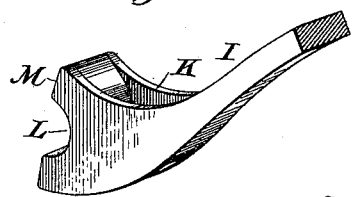
Witnesses
Inventor
Samuel Gress,
by
Attorneys
THE NORRIS PETERS CO., PHOTO-LITHO., WASHINGTON, D. C.

UNITED STATES PATENT OFFICE.

SAMUEL GRESS, OF SCRANTON, PENNSYLVANIA.

THILL-COUPLING.

SPECIFICATION forming part of Letters Patent No. 615,269, dated December 6, 1898.

Application filed August 2, 1898. Serial No. 687,524. (No model.)

*To all whom it may concern:*

Be it known that I, SAMUEL GRESS, residing at Scranton, in the county of Lackawanna and State of Pennsylvania, have invented a new and useful Pole or Thill Coupling, of which the following is a specification.

My invention relates to certain improvements in vehicles, and more particularly to an improved pole or thill coupling.

One of the objects of my invention is to provide a coupling by means of which a pole or thill may be easily and quickly attached to or detached from a vehicle, said coupling to be composed of a minimum number of parts and constructed so as to prevent rattling, the parts being secured in position without the necessity of employing the usual bolt connections, means being provided whereby the pole or iron carrying the shaft or pole will be securely held in place while a horse is attached to the vehicle, but may be quickly and easily disconnected when desired.

With these and other objects in view my invention consists in certain novel features of construction and in combinations of parts, more fully described hereinafter and particularly pointed out in the claims.

In the drawings forming a part of this specification, Figure 1 is a perspective view of my improved coupling in an operative position. Fig. 2 is a vertical sectional view on the dotted line $xx$ of Fig. 1. Fig. 3 is a perspective view showing the clip and hook detached. Fig. 4 is a detail perspective view of the thill-iron detached. Fig. 5 is a similar view of a pole-iron.

In carrying out my invention I have shown an axle A and a clip B, adapted to embrace it. This clip has downwardly-extending legs C C, provided with screw-threaded ends to receive the plate D, which is secured in position by means of nuts E. Formed integrally on the front of the clip is a curved hook F, pointing upward and leaving a space at its top, as shown at G, between it and the clip.

H represents a cylindrical extension formed on the front of the clip between it and the central rear portion of the curved hook F and concentric with its curve.

I indicates a thill-iron curved as shown and provided with a slot K to be passed over the hook F. The front end of this thill-iron has a cut-away or grooved front face L, freely movable on the cylinder H when the parts are in operative position, shoulders M at the ends of said face limiting the movement of the thill-iron by coming in contact with the thill-iron above or below the cylindrical extension H.

In Fig. 5 I show a pole-iron which is substantially similar in shape and operation to the thill-iron.

When it is desired to use the coupling, the thill or pole iron is passed over the top of the hook, the slot permitting this to be done, and moved downward until the thill or pole is in proper position, the lower shoulder M limiting the downward movement.

All that is necessary to remove the pole or thill iron is to raise the same until it may be removed from the opening between the clip and the upper part of the hook F.

The device is very simple in construction and composed of but a few inexpensive parts, and while I have illustrated and described the best means now known to me for carrying out my invention I do not wish to be understood as restricting myself to the exact details of construction shown, but hold that any slight variation therefrom, such as might suggest itself to the ordinary mechanic, would clearly be comprehended in the limit and scope of my invention.

Having thus described my invention, what I claim as new, and desire to secure by Letters Patent of the United States, is—

1. A pole or thill coupling, comprising a clip having a cylindrical extension on the face thereof, and a hook formed integrally therewith on its front face, pointing upward and having its inner face concentric with said extension substantially as set forth.

2. A pole or thill coupling having a clip provided with a cylindrical extension on its face, a curved hook formed integrally with the clip pointing upward concentric with the cylindrical extension, and a pole or thill iron having a curved slot and freely movable over the hooked portion for the purpose set forth.

3. A pole or thill coupling having a clip, a curved hook and cylindrical extension formed integral therewith on the front face thereof, leaving an opening between the upper part of the hook and the clip, and the pole or thill iron provided with a curved face and curved slot to fit over the hook, stops being provided at each end of the curved face to limit the movement of the pole or thill iron by contacting with the clip, substantially as described.

SAMUEL GRESS.

Witnesses:
T. A. EYNON,
T. E. DORIES.